United States Patent [19]

Goerndt

[11] Patent Number: 5,733,591
[45] Date of Patent: Mar. 31, 1998

[54] METHOD FOR AUTOMATICALLY SWEETENING TEA

[75] Inventor: Steven J. Goerndt, Birmingham, Ala.

[73] Assignee: Royal Cup, Inc., Birmingham, Ala.

[21] Appl. No.: 723,305

[22] Filed: Sep. 30, 1996

Related U.S. Application Data

[62] Division of Ser. No. 540,344, Oct. 6, 1995, Pat. No. 5,579,678.

[51] Int. Cl.⁶ .................................................. A23F 3/00
[52] U.S. Cl. .......................... 426/231; 426/435; 426/597
[58] Field of Search ...................................... 426/231, 597, 426/433, 435; 99/280, 300, 323.1, 323.3

[56] References Cited

U.S. PATENT DOCUMENTS

| 5,200,221 | 4/1993 | Knepler | 426/231 |
| 5,393,540 | 2/1995 | Bunn et al. | 426/231 |

*Primary Examiner*—George Yeung
*Attorney, Agent, or Firm*—Veal & Associates

[57] ABSTRACT

A control circuit and method for brewing and storing sweetened tea in large volume using an automatic tea brewing apparatus utilizes a separate timer to control the introduction of a liquid flavoring agent into the canister. The timer is initiated at the same time as the brewing apparatus and introduces the viscous syrup at the same time as the hot tea is introduced to the canister. The apparatus introduces the flavoring agent and dilutant water through a common line such that the line is purged of flavoring agent as each canister of tea is prepared.

18 Claims, 2 Drawing Sheets

METHOD FOR AUTOMATICALLY SWEETENING TEA

This application is a division of application Ser. No. 08/540,344 filed Oct. 6, 1995, now U.S. Pat. No. 5,579,678.

FIELD OF THE INVENTION

The present invention relates to beverage preparation systems. More particularly the present invention relates to systems as used in restaurants and the like for the preparation of sweetened beverages. In more particularity, the present invention is a method and apparatus for automatically preparing sweetened tea.

BACKGROUND OF THE INVENTION

Iced tea is a beverage enjoyed by millions of people. Many tea drinkers prefer their iced tea sweetened. However, attempting to sweeten iced tea can prove rather cumbersome because many granulated sweeteners do not readily dissolve. The restaurant industry has attempted to meet this customer demand by preparing pre-sweetened tea. Restaurants typically prepare pre-sweetened tea by manually adding sweeteners to freshly brewed hot tea which promotes dissolution of tile sweeteners. Since tea is consumed in great quantities, large volumes of tea must be prepared. Manually sweetening this amount of tea is both time consuming and inconvenient.

As a result, automatic tea brewing and sweetening systems have developed. An example is U.S. Pat. No. 5,116,632 issued to Miller. The '632 patent discloses an automatic tea brewing and sweetening system which sits in a refrigerated room and has transport lines carrying the tea to a remote dispenser, usually a service station in the restaurant. This apparatus is both expensive to set up and consumes a rather large mount of space. A more practical automatic tea brewing and sweetening apparatus which has developed is similar to the ubiquitous automatic coffee makers. Specifically, automatic tea brewers similar to those made by the Bunn-O-Matic Corporation are known to exist and use a set of timers to control the brewing of unsweetened tea at a service counter. Although these automatic tea makers effectively prepare freshly brewed tea, attempts at incorporating an automatic sweetening feature have proven difficult and have yielded inconsistent tea products. Specifically, the introduction of a liquid sweetener has not been accomplished in a manner which creates a fully mixed sweet tea and which is not prone to clogging of the sweetener delivery conduits.

From the foregoing it may be seen that there is still a need for an improved method and apparatus for automatically preparing freshly brewed and sweetened tea.

SUMMARY OF THE PRESENT INVENTION

It is an object of the present invention to provide a method and apparatus for preparing pre-sweetened tea which can easily be used in homes, offices, and restaurants.

It is another object of the present invention to provide a method and apparatus which uses minimal space.

It is yet another object of the present invention to provide a method and apparatus which produces a consistently sweetened tea product.

It is a further object of the present invention to provide a method and apparatus which allows a variety of sweeteners to be used so that the tea drinker can tailor the tea for preferred flavors.

These and other objects of the present invention are accomplished through a method and apparatus which utilizes the tried and proven methods of brewing tea and which incorporates a sweetening step without unduly changing the routine of the personnel brewing the tea. Specifically, the present invention utilizes a supply source of a viscous corn sweetener which is introduced to the brew in manner that facilitates proper mixing and prevents clogging of the conduits used for the delivery. Our improvement utilizes a standard tea brewing system, such as those available from Bunn-O-Matic Corporation. Bunn-O-Matic has modified certain tea brewers and such modifications are incorporated and used in conjunction with my invention. In the present invention the cold water supply to the tea container is interrupted by a tee connection such that sweetener is injected into the line from the water supply to the tea container. A significant portion of the method of use of the present invention resides in recognizing how such a corn syrup, a viscous and sticky liquid can be properly integrated. Accordingly, a known volume of sweetener is injected into the tea container as the tea is being brewed such that the heat of the tea helps in the dissolving of the syrup into solution. Specifically, I have provided a circuit for use on a tea brewer, wherein the start switch is used to toggle a plurality of timers. Two of the timers exist in the prior art tea brewer and control the brew time and the dilution of the tea. The timer added by the present invention times the delivery of the corn sweetener to the brewed hot tea concentrate. The operation of the timer in conjunction with the other timers achieves the optimum input of the sweetener to the solution.

BRIEF DESCRIPTION OF THE DRAWINGS

Apparatus embodying features of my invention are depicted in the accompanying figures, which form a portion of this disclosure and wherein.

DESCRIPTION OF A PREFERRED EMBODIMENT

Figure 1:
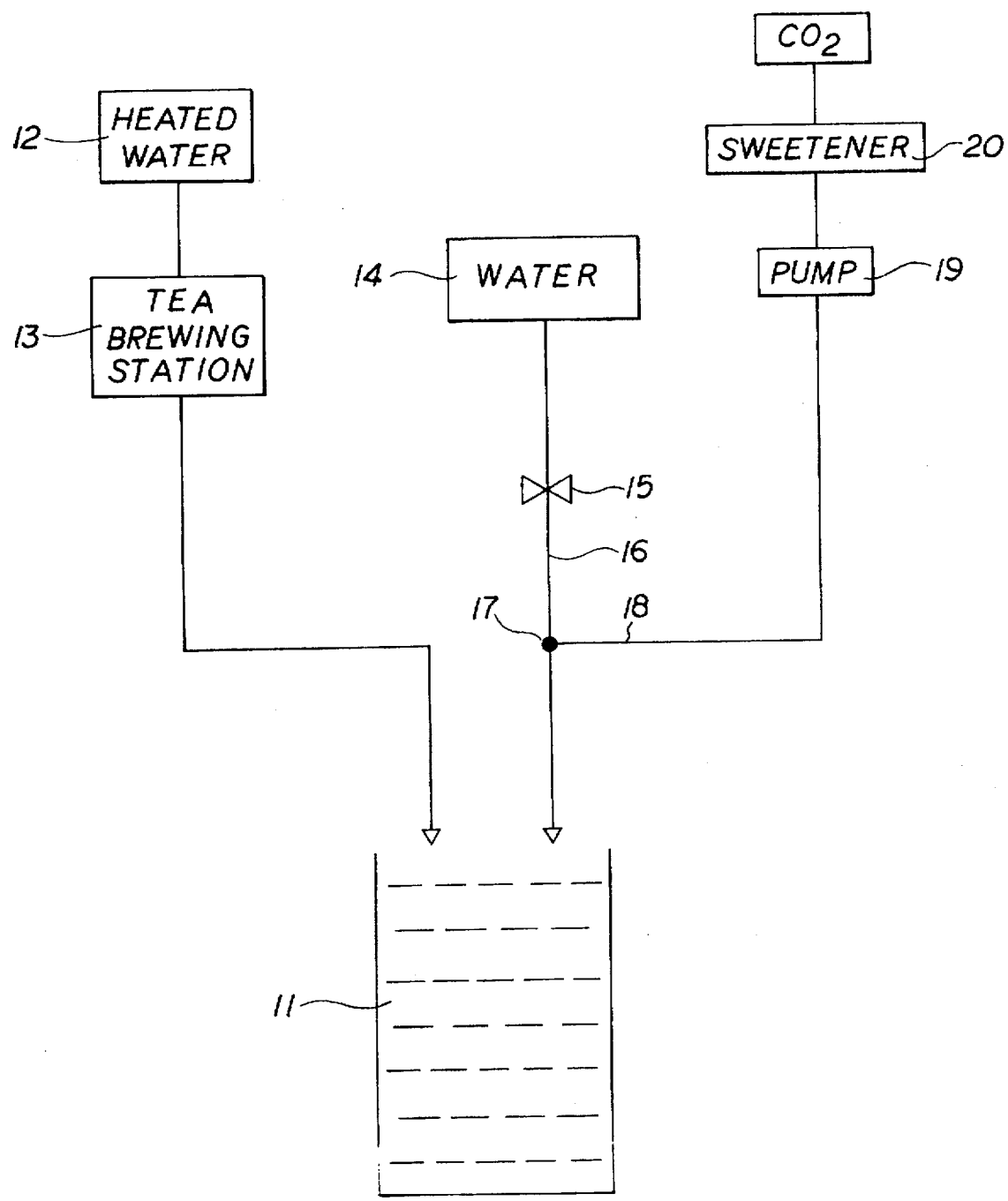
FIG. 1 is a diagrammatic depiction of the tea brewing system.
Figure 2:
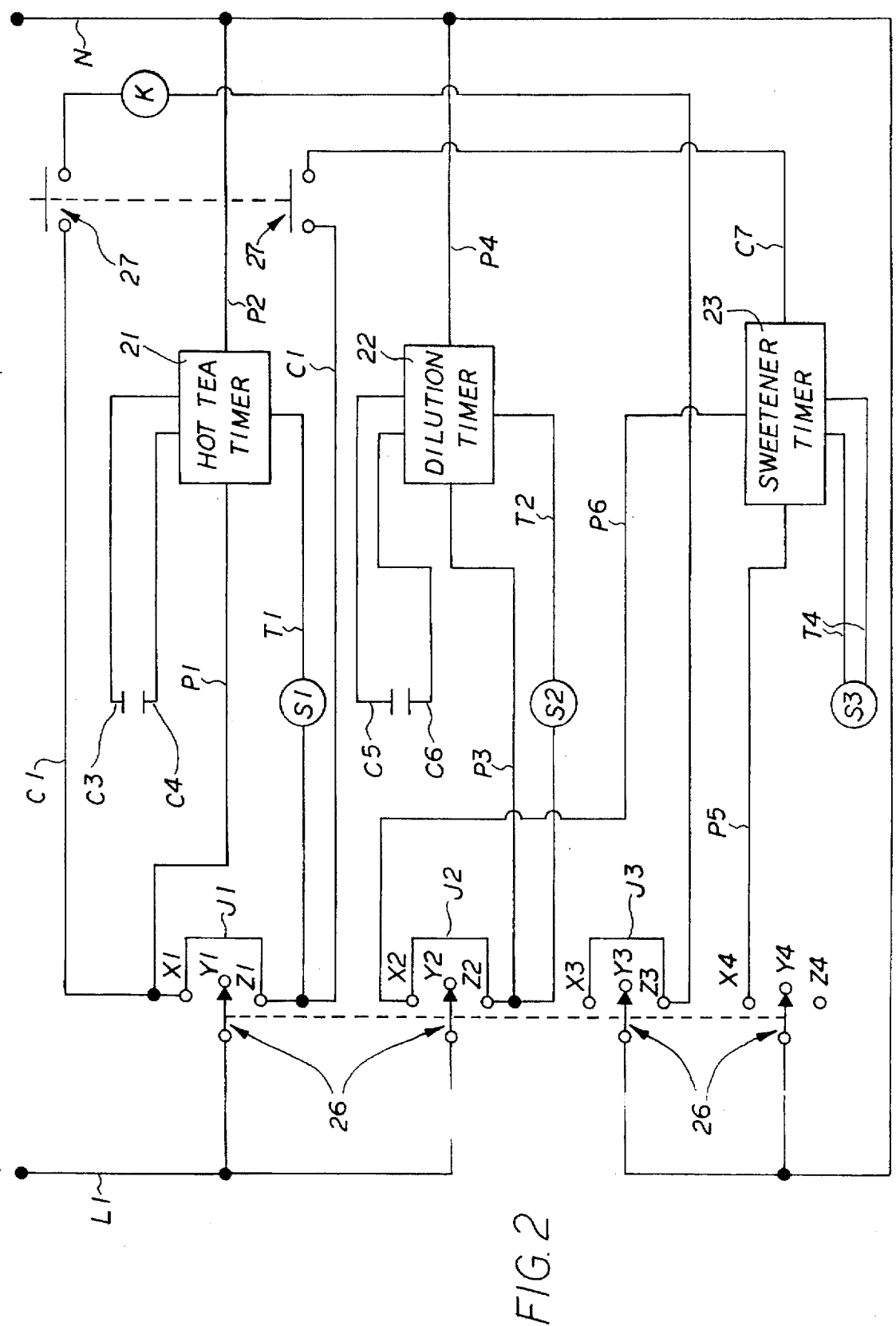
FIG. 2 is a schematic diagram of the control system for the brewing system.

Referring to the Figures for a clearer understanding of the invention, it may be seen in FIG. 1, that the finished tea product is contained in a container 11. During the process heated water from a source 12 is combined with tea in a brewing station 13 in accordance with the timing schedule regulated by a hot tea timer 21 shown in FIG. 2. The hot tea is discharged into the container, as is well known in the art. Distilled water or suitable water from a source 14 is admitted to the container after a suitable brewing period to dilute the brew under the control of a dilution timer 22 as shown in FIG. 2. The dilution timer 22 controls valve 15 in a conduit 16 from source 14 to container 11. Downstream from valve 15 is a tee connector 17 to which a sweetener conduit 18 is connected. Conduit 18 is connected to a pump 19 of the type used to pump corn syrup or fountain syrups as is well known. Pump 19 is connected to a source of sweetener 20 which is pressurized by a CO2 canister as is well known. Pump 19 is adjustable such that the flow rate of sweetener from source 20 can be controlled and such that the amount of sweetener dispensed is a function of the time the pump is operating. The pump is controlled by timer 23 presented by the present invention.

With reference to FIG. 2, a 120 volt AC 2 wire single phase control circuit is shown. L1 and N are the two wire electrical connectors. A three position multi-tap selector switch 26 is connected to L1 and provides a circuit path to the control components. Line P1 connects switch 26 to hot tea timer 21 which is connected to N as by P2. Line P3 connects switch 26 to dilution timer 22 which is connected to N as by P4. Timers 21 and 22 receive control signals through a relay K which is serially connected to a toggle start switch 27. Line C1 connects switch 27 and switch 26. Lines C3 and C4 are the control circuit path to hot tea timer 21 from relay K. Lines C5 and C6 are the control circuit path to dilution timer 22 from relay K. Timer 21 is connected to control solenoid S1 via line T1 to provide a energizing circuit path. Timer 21 and solenoid S1 control the Hot tea brew time as in the original Bunn-O-Matic device. Timer 22 is connected to control solenoid S2 via line T2 to provide an energizing circuit path. Timer 22 and solenoid S2 control the addition of diluting water to the container 11 as in the Bunn-O-Matic device. Switch 26 has three positions indicated at X, Y, and Z and is configured for four parallel connections at each position. However, X1 and Z1 are connected by jumper J1 to serve as a common connection, as are X2 and Z2, as are X3 and Y3 by jumpers J2 and Z3 respectively. Accordingly, P1 and P3 are connected to L1 regardless of whether switch 26 is set to the X or Z terminals. Likewise, Switch 27 is connected to switch 26 at either the X or Z terminals. The Y terminals turn power off to the entire control system.

Line P5 connects terminal X4 of switch 26 to a sweetener timer 23. Line C7 connects start switch 27 to sweetener timer 23. Line P6 connects jumpered terminals X2 and Z2 to sweetener timer 23. Sweetener timer 23 controls control solenoid S3 via lines T4. Solenoid S3 controls the operation of pump 19. Terminals Y4 and Z4 are both open. Accordingly, it may be seen that sweetener timer 23 will only be powered with selector switch 26 connected to the X terminals; thus, this switch position is marked on the apparatus as "sweet", whereas the switch position corresponding to the Z position is marked as "unsweet", and the Y position is "off".

In operation, it will be seen that with the selector switch 26 in the sweet position, a clean and empty container 11, a quantity of tea in the brew basket in the brewing station 13, the apparatus awaits a start signal. An operator initiates the tea making process by depressing spring loaded start switch 27 which directly initiates sweetener timer 23 and which actuates relay K to initiate hot tea timer 21 and dilution timer 22 as appropriate. Sweetener timer 23 actuates solenoid S3 to turn on pump 19 which draws corn sweetener from the pressurized bag in a box source at a preset rate until timer 23 times out and deenergizes Solenoid S3 to release the pump 19. Pump 19 delivers the sweetener Through conduit 18, connector 17, conduit 16 to canister 11 as soon as the start switch is initiated and for whatever period timer 23 is set for. Simultaneously, timer 21 energizes solenoid S1 to admit hot water to the brew station 13 and the resultant tea concentrate is delivered from the brew station 13 to the canister where it is mixed with the corn sweeter. When sufficient tea concentrate has been brewed, timer 21 times out deenergizing solenoid S1. Delivery of the sweetener by pump 19 is completed and thereafter timer 22 energizes solenoid S2 to open valve 15 to admit a quantity of diluting water for mixing with the hot tea concentrate and dissolved corn sweetener. The diluting water passes through connector 17 and conduit 16 flushing any residual corn sweetener to prevent clogging. When a sufficient quantity of water has been added to the canister 11, timer 22 times out, deenergizing solenoid S2 and closing valve 15. Although the corn sweetener should be completely dissolved, the operator may nonetheless continue the standard practice of tapping off a quantity of the mixture in the canister and pouring it back into the canister to assure more through mixing.

Placing the selector switch in the unsweet position disables timer 23 but does not affect the operation of timers 21 and 22; thus, unsweetened tea is brewed in the normal manner.

From the foregoing it may be seen that my invention has provided a simple yet efficient solution to a problem which had not been heretofore solved. While I have shown the invention in one form, it is to be understood that the foregoing description is presented by way of example, and should not be considered as limiting the invention as defined in the appended claims, the full scope of which is claimed.

What I claim is:

1. A method of brewing tea in volume in an automatic brewing machine having a brewing station and a collection canister for receiving hot brewed tea and dilutant water comprising the steps of:

(a) timing the brewing of hot brewed tea in said brewing station from an initial time through delivery of a specified quantity of hot brewed tea to said canister;

(b) introducing liquid flavoring into said canister at a preselected rate for a specified time from said initial time to provide a predetermined quantity of said flavoring in said canister for intermixing with said hot brewed tea; and, (c) introducing dilutant water to said canister through a common conduit with said liquid flavoring subsequent to the introduction of said liquid flavoring in an amount sufficient to achieve a desired dilution ratio in said canister and to purge said common conduit of remnants of said flavoring.

2. A method of brewing tea according to claim 1 wherein step (a) is controlled by a first timer operatively connected to a control circuit which, in turn, is connected to a source of power to initiate step (a).

3. A method of brewing tea according to claim 2 wherein step (b) is controlled by a second timer operatively connected to said control circuit.

4. A method of brewing tea according to claim 3 wherein step (c) is controlled by a third timer operatively connected to said control circuit.

5. A method of brewing sweetened tea in an automatic brewing machine having a brewing station operatively connected to a source of power, a control circuit, and a collection container, said method comprising the steps of:

(a) initiating a brewing cycle by connecting the source of power to the control circuit;

(b) brewing a predetermined quantity of hot brewed tea in said brewing station;

(c) introducing a predetermined quantity of hot brewed tea into said container;

(d) introducing a predetermined quantity of liquid sweetener into said container concomitantly with said hot brewed tea for intermixing therewith; and (e) introducing a predetermined quantity of dilutant water into said container subsequent to the introduction of said liquid sweetener through a common conduit with said liquid sweetener to purge said common conduit of said liquid sweetener.

6. A method of brewing sweetened tea according to claim 5 wherein step (b) comprises adding a predetermined volume of heated water to a predetermined amount of tea leaves for a predetermined amount of time in said brewing station to yield hot brewed tea.

7. A method of brewing sweetened tea according to claim 5 wherein steps (b) and (c) are controlled by a first timer connected to said control circuit.

8. A method of brewing sweetened tea according to claim 5 wherein step (d) is controlled by a second timer connected to said control circuit.

9. A method of brewing sweetened tea according to claim 5 wherein step (e) is controlled by a third timer connected to said control circuit.

10. A method of brewing sweetened tea in an automatic brewing machine having a brewing station operatively connected to a source of power, a control circuit, and a collection container, said method comprising the steps of:

(a) initiating a brewing cycle by connecting the source of power to the control circuit;

(b) adding a predetermined volume of heated water to a predetermined amount of tea leaves for a predetermined amount of time in said brewing station to yield hot brewed tea and filtering said tea leaves from said hot brewed tea as said hot brewed tea is introduced into said container;

(c) introducing a predetermined quantity of liquid sweetener into said container concomitantly with said hot brewed tea for intermixing therewith; and (d) introducing a predetermined quantity of dilutant water into said container subsequent to the introduction of said liquid sweetener through a common conduit with said liquid sweetener to purge said common conduit of said liquid sweetener.

11. A method of brewing sweetened tea according to claim 10 wherein step (b) is controlled by a first timer connected to said control circuit.

12. A method of brewing sweetened tea according to claim 10 wherein step (c) is controlled by a second timer connected to said control circuit.

13. A method of brewing sweetened tea according to claim 10 wherein step (d) is controlled by a third timer connected to said control circuit.

14. A method of brewing sweetened tea according to claim 12 wherein said liquid sweetener in step (c) is transferred from a source of liquid sweetener to said container by transferring means operatively connected to said second timer.

15. A method of brewing sweetened tea according to claim 14 wherein said transferring means comprises valve means connected between said source of liquid sweetener and said container for controlling the introduction of said sweetener into said container.

16. A method of brewing sweetened tea according to claim 15 wherein said transferring means further comprises a pump.

17. A method of brewing sweetened tea according to claim 13 wherein said dilutant water in step (d) is transferred from a source of dilutant water to said container by delivering means operatively connected to said third timer.

18. A method of brewing sweetened tea according to claim 17 wherein said delivering means comprises valve means connected between said source of dilutant water and said container for controlling the introduction of said dilutant water into said container after said sweetener has been transferred into said container.

* * * * *

UNITED STATES PATENT AND TRADEMARK OFFICE
CERTIFICATE OF CORRECTION

PATENT NO. : 5,733,591
DATED      : March 31, 1998
INVENTOR(S): Steven J. Goernt It is certified that error appears in the above-indentified patent and that said Letters Patent is hereby corrected as shown below:

Column 1, Line 24:   change:   "tile"   to "the"

Column 1, Line 35:   change:   "mount" to "amount"

Signed and Sealed this

Twenty-eighth Day of July, 1998

*Attest:*

BRUCE LEHMAN

*Attesting Officer*   *Commissioner of Patents and Trademarks*